United States Patent [19]

Herzog

[11] 4,114,035
[45] Sep. 12, 1978

[54] POSITION ENCODER EMPLOYING CHARGE TRANSFER CIRCUIT

[75] Inventor: Gerald Bernard Herzog, Princeton, N.J.

[73] Assignee: RCA Corporation, New York, N.Y.

[21] Appl. No.: 700,120

[22] Filed: Jun. 28, 1976

[30] Foreign Application Priority Data

Jan. 30, 1976 [GB] United Kingdom ............... 03792/76

[51] Int. Cl.² .................. H01J 39/12; H03K 13/02
[52] U.S. Cl. ..................... 250/211 K; 235/92 MP; 340/347 P
[58] Field of Search ............. 340/347 P, 347 M; 250/211 K, 214, 229, 568, 571, 560, 561, 563, 223 R; 307/221 R, 221 C; 235/92 MP; 356/158–160

[56] References Cited

U.S. PATENT DOCUMENTS

| | | | |
|---|---|---|---|
| 2,896,086 | 7/1959 | Wunderman | 250/211 K |
| 3,518,660 | 6/1970 | Nicklas et al. | 340/347 DD |
| 3,588,452 | 6/1971 | Kee | 235/61.11 E |
| 3,639,729 | 2/1972 | Marshall | 235/61.11 E |
| 3,760,356 | 9/1973 | Srivastava | 340/146.3 Y |
| 3,845,295 | 10/1974 | Williams et al. | 307/221 C |
| 3,861,480 | 1/1975 | Zucker et al. | 177/DIG. 6 |
| 3,882,302 | 5/1975 | Deichmiller et al. | 235/92 R X |
| 3,956,629 | 5/1976 | Gomm et al. | 250/223 R |
| 4,013,832 | 3/1977 | Douglas | 250/211 J X |

FOREIGN PATENT DOCUMENTS

243,966 10/1969 U.S.S.R. ............................ 235/61.6 A

Primary Examiner—Thomas J. Sloyan
Attorney, Agent, or Firm—H. Christoffersen; Samuel Cohen

[57] ABSTRACT

An element, the position of which it is desired to sense, controls the illumination of a charge transfer register. In one embodiment, for example, the element controls the position of a mask between a light source and a linear CCD array to thereby control the number of CCD stages which will receive photon induced charge signals. These signals, when shifted out of the register, may be employed directly as a digital manifestation indicative of position or may be converted to another form of such a manifestation.

3 Claims, 4 Drawing Figures

POSITION ENCODER EMPLOYING CHARGE TRANSFER CIRCUIT

This invention relates to apparatus of the non-contacting type for translating positional information into an electrical signal manifestation in digital form.

There are many industrial applications in which it is necessary to convert the analog values of various parameters into digital form so that they can be processed by a digital computer. It is often possible conveniently to translate such parameters (fluid pressure, fluid flow rate, and temperature are typical examples, and there are others) into the movement of an element such as a shaft, piston, gear or the like, and the position of this element will then have some relationship-sometimes linear, sometimes not, to the value of the parameter.

In systems embodying the present invention, the position of an element is translated into a digital representation by employing that element to control the particular stage or stages of a charge transfer array which are illuminated. The array, such as a linear charge-coupled device (CCD) array, produces and then stores charge signals in response to the illumination it receives and these charge signals when subsequently read out of the array may be employed directly as a digital manifestation or may be employed to produce a second form of digital manifestation.

In the drawing

Figure 1:
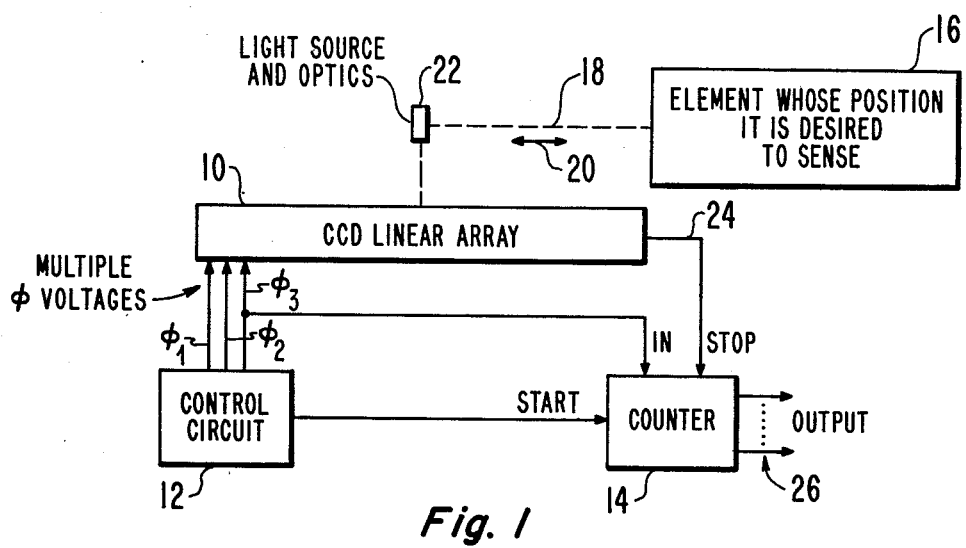
FIG. 1 is a block diagram of one embodiment of the invention.

The system shown in FIG. 1 includes a charge transfer register 10 of the CCD type. This particular register is a linear array and may include a semiconductor substrate and electrodes over the substrate and insulated therefrom. The electrodes may be formed of polysilicon or other conductors and the source of light to be described may be employed to illuminate the register through the electrodes. Alternatively, the CCD register may be "back illuminated," that is, illuminated through the back surface of the substrate. The structure and operation of linear CCD arrays of this type is sufficiently well known that no further description is believed necessary. The array may be one of the surface or buried channel type.

A control circuit 12 controls the operation of the system. Among other functions, it supplies the multiple phase voltages $\phi_1$, $\phi_2$, $\phi_3$ to the CCD array and a "start" signal to counter 14. The pulses which are counted may be those forming one of the multiple phase voltages such as $\phi_3$ (it is assumed for purposes of the present discussion that the CCD array is a three-phase array although it may instead by operated by two, four or some other number of phases). The "stop" signal for counter 14, in this particular embodiment, may be the output signal from the CCD array 10 as will be discussed shortly.

The element whose position it is desired to sense is illustrated by block 16. A shaft 18, illustrated by a dashed line, is fixed to element 16. The element and shaft are movable in the direction of arrows 20, that is, along the length of the CCD array. A light source and suitable optics, both designated by the small rectangle 22, are secured to the shaft 18. The light source may, for example, be a light emitting diode and the optics a simple lens system or reflector for focussing the light onto a location in the CCD array 10.

In operation, the control circuit initially may supply voltages to the CCD array such as to maintain the substrate regions beneath the electrodes in accumulation. This prevents the storage of charge signals in these regions. Alternatively, the array may quiescently receive the three phase shift voltages for continually shifting any photon induced or thermally induced charge signal out of the array to thereby maintain the array in a cleared condition. The element whose position it is desired to sense causes the light source and optics 22 to be moved to a given position along the length of the array. At this time, the control circuit 12 is caused to change the potentials applied to the electrodes of the CCD array so that at each location there is a depletion region in the substrate and there are potential barriers between the depletion regions. For example, assuming a surface channel array with a P type substrate, the $\phi_1$ electrodes may be placed at a positive potential to form depletion regions beneath these electrodes and the $\phi_2$ and $\phi_3$ electrodes may be placed at less positive potentials to form potential barriers beneath these electrodes. During the period such voltages are present, any charge induced at a particular location in the array in response to the light produced by source 22 will cause charges to be generated and stored at the location onto which the light is focussed.

The charge collection voltages continue to be applied to the array 10 for an interval known as an "integration time". In practice, this may be a fraction of a second such as 1/100th of a second or 1/50th second; or some other relatively short time period, the exact number depending upon such parameters as the light source intensity, the depth of the potential wells (the depletion regions) and the amount of charge it is desired to accumulate during the integration time. Upon the completion of the integration time, there will be charge stored beneath only one of the electrodes of one of the stages (in a preferred embodiment), although the design could be such that the light source illuminates a small number, greater than one, of the CCD stages. The position along the length of the array of the location storing a charge is indicative of the position of the element 16.

Upon the completion of the integration time, the control circuit applies the multiple phase voltages in a sense to propagate the charge signal down the linear array. Concurrently, it starts the counter 14. The counter thereupon counts the $\phi_3$ pulses. After a certain number of shift periods, the charge signal stored in the CCD array reaches the output lead 24 of the array and is applied to the stop terminal of counter 14. This terminates the count, and the parallel output of the counter at this time is indicative of the position of source 22 (which is indicative of the position of element 16. This output represents a binary number and appears at the output leads shown schematically at 26.

It is assumed in the discussion above that the linear array is in the dark and is illuminated only by light source 22. If desired, a mask may be connected to shaft 18 to mask all portions of the linear array except that illuminated by element 22.

In some applications, the position of shaft 18 may be related in some non-linear way to the parameter being measured. In this case, the count produced by counter 14 will not indicate the true value of the parameter. The modification of FIG. 2 produces an output under such circumstances which is a true measure of the value of the parameter. In the system illustrated in part here, the counter connects to a look-up table such as a small memory, and each count is indicative of a different address in the memory. The memory produces an output indicative of the true value of the parameter indicated by the count.

Figure 3:
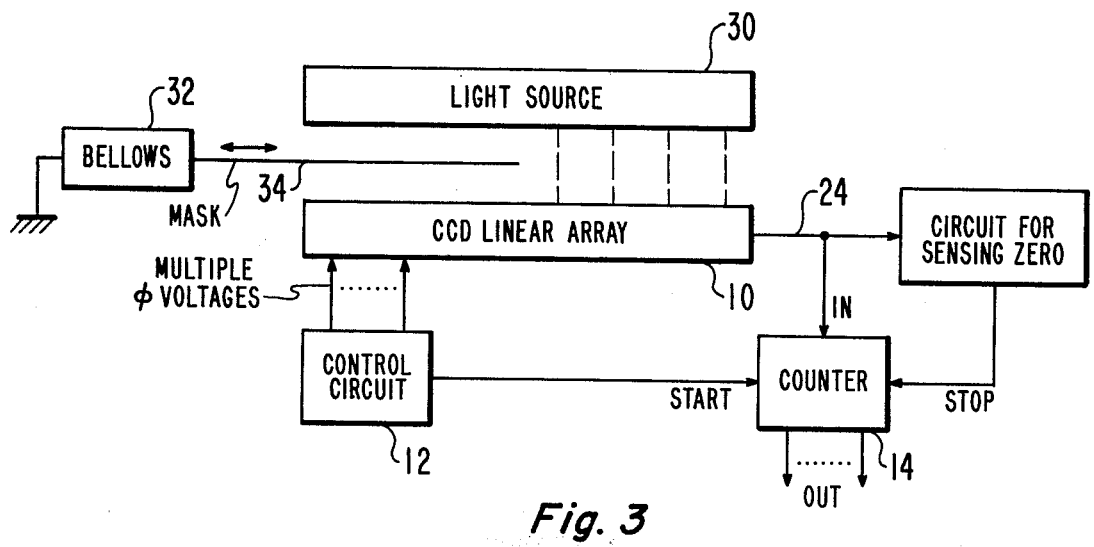
FIG. 3 is a block diagram of another embodiment of the invention.

FIG. 3 illustrates another embodiment of the invention. Here, the source 30 can be a line light source and remains in fixed positive over the CCD linear array. Alternatively here and in FIG. 4, the source can be almost any form of radiation source, of sufficient intensity, placed a suitable distance from the CCD. In many applications the CCD need only be a fraction of an inch long and still have many (several hundred or more) stages and in these applications a small source such as one or more light emitting diodes, spaced a few inches or so from the CCD, possibly with some simple lenses in between, will serve as a suitable means for uniformly illuminating the unmasked portion of the CCD. The element whose position it is desired to sense is illustrated as a bellows 32. The bellows connects to a mask 34 located between the light source 30 and the CCD array 10. Thus, the position of the bellows determines the number of stages in the CCD linear array which are illuminated.

The operation is somewhat similar to that discussed above. The CCD array 10 essentially may be held in an erased condition either by maintaining the substrate in accumulation or by rapidly shifting the contents of the array out of the array. The control circuit 12 is caused to apply the voltages necessary for charge collection to the CCD electrodes in the same way as described for FIG. 1 and these voltages continue to be applied for the duration of an integration time. Then the control circuit shifts the contents of the CCD array serially out of the array, in conventional fashion, by the application of the multiple phase voltages. In the form of the invention illustrated, the control circuit starts the counter with the start of the serial shifting operation. The counter counts the signals read serially from the array via output lead 24. These signals represent successive "1" bits. If, for example, the mask 34 masks all but the last fifteen stages of the CCD array, the output will consist of fifteen "ones" and the counter will produce an output count indicative of fifteen. The sixteenth bit read from the array will be a zero. It may be applied to a circuit for sensing the zero and this circuit applies a stop signal to the counter. The circuit for sensing the zero may, for example, comprise a NOR gate, one input terminal of which connects to lead 24. The other terminal of the NOR gate may be biased to a voltage indicative of a "one" during the integration time and to a voltage indicative of a "zero" as soon as the first bit shifted out of the array reaches the counter. In the example above, the sixteenth bit will be a zero which will cause the NOR gate to apply a "one" to the stop terminal, stopping the counter.

In an alternative form of the circuit of FIG. 3, the output of the linear array may be used directly. This output will have a number of ones indicative of the number of stages of the array receiving illumination and this number of ones, in turn, is indicative of the position of an element moved by the bellows 32. This output can be read out in serial fashion, as shown or, with a suitable CCD, can be shifted out in parallel.

In the circuit of FIG. 1 as well as in the circuit of FIG. 3, after each operating cycle the system may again be operated in exactly the same way to sense whether or not the position of the element has changed and, if it has, what its new position is. If the periodic sensing occurs at a sufficiently high rate, the readout of the array into the counter is sufficient to clear (erase) the array.

If desired, in the embodiment of FIG. 3 the light source 30 may be turned off during the shifting of the contents of the CCD array into the counter. The control may be via the control circuit which may send a signal to a switch (not shown) such as a semiconductor device switch, in the light source circuit for turning the source off. The source then may be turned on again at the beginning of the next integration time. However, this is not essential to the invention. If the light source remains on during the transfer of signal out of the CCD array, there may be some smearing but it can be discriminated against by a threshold circuit within the counter.

Figure 2:
FIG. 2 is a block diagram of a modification of the system of FIG. 1.

The embodiment of FIG. 3 may employ the system of FIG. 2 to translate a position which is non-linearly related to the parameter being measured to an output which accurately indicates the value of the parameter.

Figure 4:
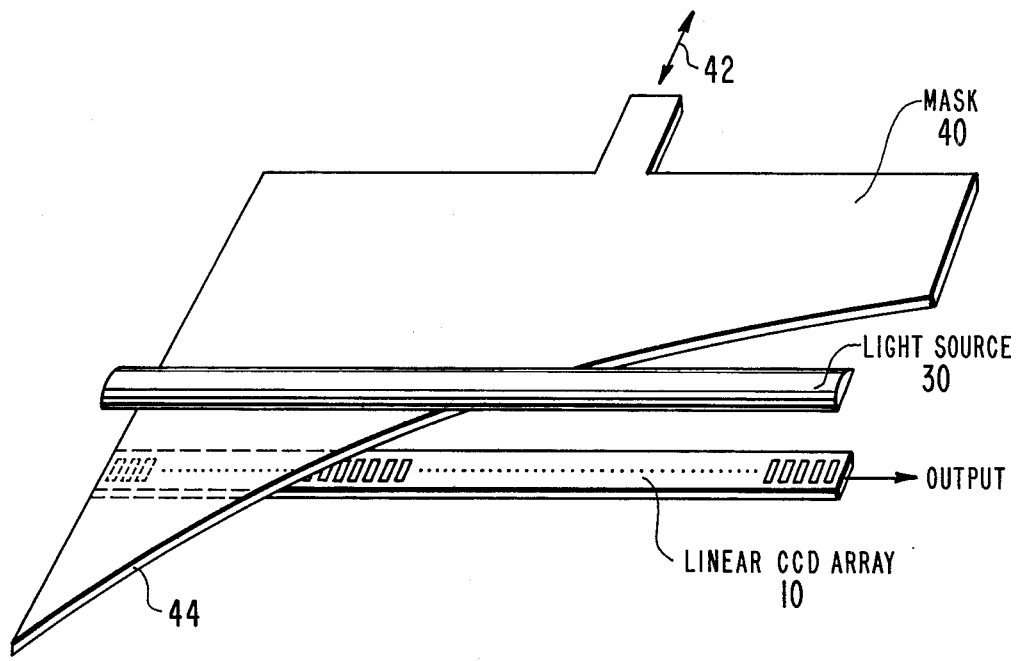
FIG. 4 is a perspective schematic showing of another embodiment of the invention.

FIG. 4 illustrates another embodiment of the invention. It concludes a light source 30 and a linear CCD array 10 which are similar to the like number elements of FIG. 3. However, the mask 40 is moved not in a direction parallel to the long dimension of the CCD array 10, but rather perpendicular thereto, as indicated by arrows 42. If the edge 44 of the mask forms a straight line, then the position of the element moving the mask will be linearly related to the digital quantity produced by the CCD array, when read out, just as in the system of FIG. 3. However, if the edge 44 is in the form of a curve, as shown, then the movement of the mask in the direction 42 will be translated in non-linear fashion to a number of potential wells in the CCD array which receive photon induced charge in response to illumination by the light source 30. This makes it possible, using an edge 44 of a shape suitable to the non-linearity it is desired to correct, to translate a movement of an element which is non-linearly related to the parameter being measured to a number of filled potential wells in the CCD array 10 which is linearly related to the parameter being measured.

The remainder of the system of FIG. 4 is essentially identical to that of FIG. 3 and need not be illustrated. The operation also is similar. After the mask 40 assumes a given position, the light source 30 is turned on and the CCD array 10 is placed in its integration mode. After the integration is completed, the contents of the array 10 are shifted out of the array and the serial output thereby obtained may be used directly or applied to a counter. The light source 30 may remain on or be turned off during the readout of the CCD array 10, depending upon the mode of operation contemplated. Also, as in the embodiment of FIG. 1, erasure of the array may be accomplished by continually shifting its contents out of the array or be operating the array in the accumulation mode. That is, the light source 30 may be on quiescently, and the CCD array prevented from storing photon-induced charge by maintaining the substrate in accumulation.

In the embodiment of FIG. 4, those of the electrodes intercepted by edge 44 will be partially masked and at such location(s) less charge may become stored than at the fully exposed locations of the CCD. However, by using an amplifier with a properly selected threshold at the output of the CCD (or in the input circuit of the counter) possible errors due to such fractional charges can be substantially eliminated.

While in the various embodiments of the invention illustrated, the charge transfer array is stationary and a light source or mask is moved relative to the array, it is to be understood that these are examples only. In all embodiments it can be the array which is moved and the other elements can remain stationary. What is important is not which one of the elements is moved but rather the relative movement between elements.

While the invention has been illustrated in terms of a charge transfer device of the CCD type, it is to be understood that it is equally applicable to other forms of charge transfer devices and as those of the bucket brigade type.

What is claimed is:

1. A system for sensing the relative position of an element comprising, in combination:
   a linear charge transfer array of the type including a plurality of charge storage locations, each such location responsive to radiation for accumulating and storing charge;
   a source of radiation positioned to irradiate any portion not masked of said array;
   means responsive to the relative position of said element for physically controlling which portion of said array is irradiated by said radiation and thereby controlling which of said locations will accumulate and store charge, said means comprising a mask mechanically coupled to said element and positioned between said source of radiation and said array, said mask being movable in a direction substantially perpendicular to the long dimension of said array, in a plane between said source and said array, said mask being formed with an edge at an oblique angle to said long dimension and positioned to control the portion of the array receiving radiation from said source in accordance with the mask position; and
   means for reading out said array comprising means for shifting out of said array the charge which has become stored in said array in response to said irradiation, the pattern of signals thereby obtained being a digital manifestation of the relative position of said element in the sense that a signal representative of substantial charge may be employed to represent one binary value and a signal representative of less than a given level of charge may be employed to represent the other binary value, and means for sensing the number of signals representing a given binary value in said pattern of signals.

2. A system as set forth in claim 1, wherein said mask edge is curved so that the mask position is non-linearly translated to array irradiation.

3. A system as set forth in claim 1, further including a counter coupled to said array, and wherein said means for reading out said array comprises means for applying shift signals to said array to obtain serial readout thereof, further including means for starting said counter at the start of said serial readout, means for advancing the count by one, each shift period, and means for stopping said counter when a count has been reached indicative of the location or locations in said array in which radiation induced charge signals were stored.

* * * * *